Sept. 21, 1965

L. R. PAUN 3,207,530

TOW BAR

Filed March 20, 1963

INVENTOR
LOUIS R. PAUN

United States Patent Office 3,207,530
Patented Sept. 21, 1965

3,207,530
TOW BAR
Louis R. Paun, Granton, Wis., assignor to Telescope Hitch, Incorporated, Stoughton, Wis., a corporation of Wisconsin
Filed Mar. 20, 1963, Ser. No. 266,616
7 Claims. (Cl. 280—478)

This invention pertains, in general, to a tow bar and more particularly to a tow bar of the telescoping type for connecting a towed vehicle to a motorized vehicle.

Telescoping tow bars were developed, among other reasons, to make it possible for one person to connect two vehicles together. Without a telescoping tow bar, it is necessary to exactly position the two vehicles so that they are spaced apart the exact distance between the vehicle connectors at opposite ends of the tow bar. With a telescoping tow bar, it is possible to drive the motorized vehicle into close proximity to the towed vehicle and extend the tow bar so that it can be connected to both vehicles. Once the two vehicles are connected together, the motorized vehicle may be backed toward the towed vehicle and when the tow bar is in the contracted position, a locking member such as a pin, can be inserted in the tow bar to lock it in the contracted position.

Telescoping tow bars are frequently utilized in connection with farm and construction activity. Since both of these activities are concerned with the soil there is considerable mud and dirt present. It is therefore necessary that the telescoping feature of the tow bar be constructed in such a manner that it will not easily clog or become inoperative if the working portions become incrusted with mud. Furthermore, it is necessary that the tow bar be constructed in a manner so that the telescoping mechanism is capable of withstanding large jarring forces to which it may be exposed in farm or construction use.

It is, therefore, a general object of the subject invention to provide a telescoping tow bar with latch mechanism for positively locking the telescoping members in the contracted position which will operate reliably even though exposed to rough handling and inclement weather.

An additional object of the subject invention is to provide a tow bar of the hereinbefore described type wherein the latch mechanism automatically locks the tow bar in the contracted position when the motorized vehicle is backed toward the towed vehicle.

Another object of the subject invention is to provide a tow bar of the hereinbefore described type wherein the latch mechanism automatically gravitates into the locked position when the two relatively movable elements of the tow bar are in the contracted position.

A further object of the subject invention is to provide a tow bar of the hereinbefore described type wherein the latch mechanism is constructed in a manner to provide a mechanical advantage for the operator to permit easy unlocking of the two relatively movable elements.

An additional object of the subject invention is to provide a tow bar of the herein before described type wherein there is substantially no binding force on the latch mechanism when the motorized vehicle is backed toward the towed vehicle.

These and other objects of the subject invention will become more fully apparent as the following description is read in light of the attached drawings, wherein.

Figure 4:
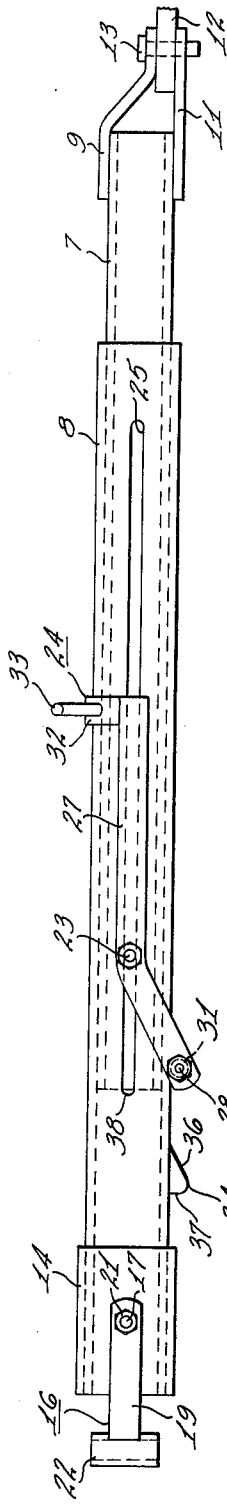
FIG. 4 is a side view of the tow bar in a partially extended position.

Referring to the drawings, the tow bar of the subject invention includes two elongated members 7 and 8. Although each member 7 and 8 is shown herein for purposes of illustration as being in the form of hollow pipes, it should be understood that any cross sectional configuration may be employed without departing from the spirit of the invention so long as the members are capable of movement relative to each other. The member 7 is of an outside diameter permitting its insertion within the member 8.

A hitching connection of any convenient form may be provided at the exposed end of the member 7 and is herein shown for purposes of illustration as including a bracket having an upper plate 9 rigidly connected to the top side of the member 7 and a plate 11 rigidly connected to the under side of the member 7. These plates may be connected in any conventional manner and are herein shown as being welded to the member 7. Furthermore, for purposes of illustration, the free ends of the two plates 9 and 11 may be provided with aligned bores. With such a hitching connection, the motorized vehicle, if it is connected to the member 7, will be provided with a draft bar partially shown and indicated as 12. This draft bar will also be provided with a bore which may be aligned with the bores in the free ends of plates 9 and 11 and a pin 13 may be passed therethrough to provide a force transmitting connection between the member 7 and the motorized vehicle.

A hitch connection must also be provided on the free end of the member 8 and this connection may also be constructed in any manner which is convenient for the type of connection provided on the vehicle to be towed. As herein shown for purposes of illustration, a reinforcing member or cap 14 may be rigidly connected to the end of the member 8 in any conventional manner such as by welding. A bifurcated member generally designated 16 may be pivotally connected to the reinforcing cap in any conventional manner such as by passing a cap screw 17 through holes provided in legs 18 and 19 in the cap 14 and in the member 8. A nut 21 is threaded on the other end of the cap screw in such a manner as to permit free swinging movement of the bifurcated member 16 in a vertical plane, about the horizontal axis of the cap screw. A pipe section 22 may then be connected to the free end of the bifurcated member 16 in any conventional manner such as by welding as is herein shown particularly in FIG. 2. The pipe section 22 is then fitted onto a vertically extending shaft (not shown) on the towed vehicle. With such a connection, it can be seen that the tow bar may be pivoted in a vertical plane about the axis of the cap screw 17 and may also be pivoted in a longitudinal plane about the axis of the pipe section 22.

Guide means must be provided between the two telescoping members 7 and 8 to guide their relative movement and also provide a limit to the range of movement permitted. Such guide means may be constructed in any conventional manner and as herein shown for purposes of illustration, an elongated slot 25 is provided in each of the diametrically opposed portions of the member 8. A guide follower herein shown for purposes of illustration as a bolt 23 is connected to the member 7 and extends through and without the slots 25. With such an arrangement, the member 7 may be moved in and out of the member 8 to the extent of the ends of the slots 25.

Figure 2:
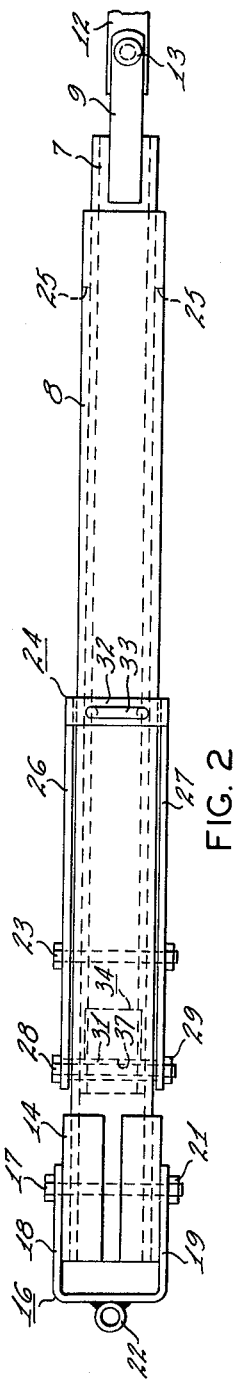
FIG. 2 is a plan view of the tow bar locked in the contracted position.
Figure 3:
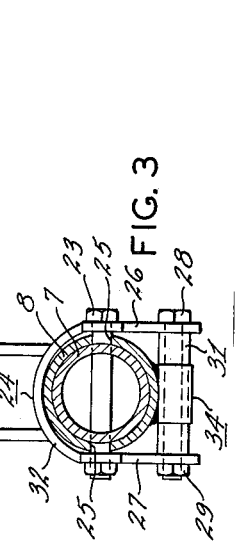
FIG. 3 is a cross section taken along lines 111—111 of FIG. 1.

It is also necessary to provide a means for locking the two telescoping members together in the contracted position. To this end and for purposes of illustration, a bifurcated member generally designated 24 is pivotally connected to the member 7 through the slots 25. The bifurcated member 24 is provided with two elongated leg members 26 and 27 which straddle the member 8. These legs 26 and 27 have aligned bores therein through which the bolt 23 passes. The legs 26 and 27 extend downward so that one end portion of the bifurcated member is below the level of the member 8 and the other end portion of the bifurcated member is above the level of the member 8. The lower end portion of the legs 26 and 27 may be connected together by means of a cap screw 28 and nut 29 as shown in FIG. 2. To facilitate locking and unlocking of the bifurcated member, a bushing or sleeve 31 may be provided about the cap screw 28 between the end portions of the legs 26 and 27 as is shown in FIG. 3.

The upper ends or the legs 26 and 27 may be connected together in any conventional manner and are herein shown connected as by a saddle member 32 having an inside radius conforming generally to the outer radius of the member 8. Furthermore, a handle 33 may be attached to the saddle 32 in any conventional manner such as by welding to further assist the operator in manipulating the latch mechanism. As shown in FIG. 4, a catch member or tang generally designed 34 may be connected to the underside of the member 8 in any conventional manner such as by welding. This tang is provided with an angled surface 36 and a substantially vertical surface 37 and may also be provided with a rounded or radius surface connecting the two above mentioned surfaces.

Figure 1:
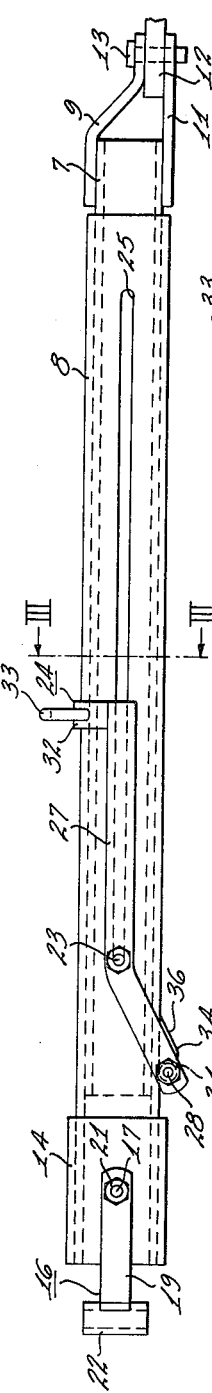
FIG. 1 is a side view of the tow bar shown locked in the contracted position.

In describing the operation of the tow bar, it will be assumed that the pipe section 22 is connected to the towed vehicle and the motorized vehicle has moved to the front of the tow bar. With the tow bar in the contracted position as shown in FIG. 1, it is only necessary for the operator to lift the handle 33 which forces the bushing 31 downward out of contact with the vertical surface 37. The member 7 can then be moved slightly forward so that when the handle 33 is released the bushing 31 will not again engage the tang vertical surface 37. It should be noted that the length of that portion of the legs 26 and 27 from the handle 33 to the pivot axis of the bifurcated member 24 is considerably longer than that portion of the legs 26 and 27 from the pivot axis to the bushing 31. This arrangement serves two purposes in that it provides a considerably larger mechanical advantage for the operator to disengage the bushing 31 from the tang 34 even though the moving elements of the tow bar might be caked with mud or might even become rusty. Furthermore, because of the greater length and therefore weight of the upper portion of the bifurcated member 24 whenever it is released it falls by gravity back to the positions shown in FIGS. 1 and 4.

When the bushing 31 has been moved from the vertical surface 37 of the tang 34 it is possible to extend the member 7 until it can be aligned with the motorized vehicle connecting hitch 12. When the two vehicles are connected together the tow bar will be in the position shown in FIG. 4. When this is accomplished the operator merely backs the motorized vehicle toward the towed vehicle causing the member 7 to slide within the member 8 guided by the slots 25 and the guide members extending therethrough. As the bushing 31 contacts the angled surface 36 of the tang 34 it follows the surface until it has passed over the radius and engages the vertical surface 37. Here again due to the considerably greater weight of that portion of the bifurcated member 24 above the pivot pin 23, bushing 31 will be held up against the bottom of the member 8 to the rear of the vertical surface 37 and thereby hold the tow bar in the contracted position.

When the bushing 31 has passed over the tang 34 and engages the vertical surface 37, the tow bar is in position to permit pulling of the towed vehicle by the motorized vehicle. It should be understood that the distance between the ends 38 of the slots 25 and a transverse line where the vertical surface 37 contacts the underside of the member 8 is equal to the distance between the pivot axis bolt 23 and the bushing 31. Therefore, when the bifurcated member 24 is in the position shown in FIG. 1, the pivot bolt 23 has just engaged the ends 38 of slots 25 thereby transmitting a backing movement of the motorized vehicle to the towed vehicle. The bushing 31 in contact with the vertical surface 37 transmits forward moving force from the motorized vehicle to the towed vehicle. Since neither locking surface or surfaces transmits both a pushing and pulling force, it is possible to assist in unlocking the latch mechanism. This can be accomplished by backing the motorized vehicle into the towed vehicle so that all binding forces will be on the pivot pin axis 23 and the bushing 31 will not be forcibly engaged with the vertical surface 37. It can thus be seen that with the feature of having separate force transmitting surface for both the forward and rearward motions of the vehicles and with the large mechanical advantage provided by the bifurcated member 24, it is an easy matter to disengage the two members 7 and 8 regardless of whether or not the elements are caked with mud or even should they become rusted.

Although only one embodiment of the subject invention has been herein shown and described, it will be apparent to those skilled in the art after having read this description that other modifications are possible and it is intended that all such modifications that come within a reasonable interpretation of the appended claims be covered.

What is claimed is:

1. A tow bar comprising: a pair of longitudinally extensible and contractible members, one of said members having an elongated longitudinally extending slot therein having closed ends; a catch on said one of said members spaced a predetermined distance from one of said closed ends; guide means connected to the other of said members coacting with said slot for sliding movement therein between said closed ends, and latch means pivotally connected to said guide means, said latch means engaging said catch when said guide means engages said one of said closed ends, said latch and said catch cooperating to hold said members from relative movement in one direction and said guide means and said one of said closed ends cooperating to hold said members from relative movement in the opposite direction.

2. A tow bar comprising: a first elongated member having a longitudinally extending slot therethrough, said slot having closed ends; a catch on said first member adjacent one of said closed ends; a second elongated member connected to said first member in a manner to permit relative sliding movement therebetween; a lever including locking means for engagement with said catch; and means passing through said slot and slidable therein pivotally connecting said lever to said second member at a point spaced from said locking means distance equal to the spacing between said one of said closed ends and said catch the portions of said lever on opposite sides of said pivot connection being so proportioned as to cause said locking means to gravitate into engagement with said catch.

3. A tow bar comprising: a first elongated member having a longitudinally extending slot therethrough, said slot having closed ends; a catch on said first member adjacent one of said closed ends; a second elongated member connected to said first member in a manner to permit relative sliding movement between extended and contracted positions; a lever including locking means for engagement with said stop means; and means passing through said slot and slidable therein pivotally connecting said lever to said second member, the portions of said lever on opposite sides of said pivot connection being so proportioned as to cause said locking means to automatically move by gravity into locking engagement with said catch as said hitch is moved from the extended position to the contracted position.

4. A tow bar comprising: a first elongated hollow member having a pair of aligned longitudinally extending slots therein, said slots having closed ends; a catch on said first member adjacent one of said closed ends; a second elongated member telescopically received within said first member for movement between extended and contracted positions; a saddle member having spaced legs passing on opposite sides of said first member and including locking means for engagement with said catch; and means passing through said slots and slidable therein pivotally connecting said saddle legs to said second member at a point spaced from said locking means a distance equal to the spacing between said catch and said one of said closed ends, the portions of said saddle legs on opposite sides of said pivot connection being so proportioned as to cause said saddle to automatically gravitate into locking engagement with said catch when said tow bar is moved from the extended to the contracted position.

5. A tow bar comprising: a first elongated hollow member having a pair of aligned longitudinally extending slots therein, said slots having closed ends; a catch on said first member adjacent one of said closed ends; a second elongated member telescopically received within said first member; a saddle member having spaced legs passing on opposite sides of said first member connected at the upper ends by an upper bar passing over the top of said first member; a transversely extending lower cross bar passing beneath said first member and connected to the lower ends of said saddle legs; and means passing through said slots and slidable therein pivotally connecting said saddle legs to said second member at a point spaced from said lower cross bar a distance equal to the spacing between said catch and said one of said closed ends, the portions of said saddle legs on opposite sides of said pivot connection being so proportioned as to cause said upper cross bar to gravitate into engagement with the top of said first member and said lower cross bar to engage said catch when said means contacts said one of said closed ends.

6. A tow bar comprising: a first elongated hollow member having a pair of aligned longitudinally extending slots therein, said slots having closed ends; a catch on said first member adjacent one of said closed ends having an inclined surface and a vertical surface; a second elongated member telescopically received within said first member for movement between extended and contracted positions; a saddle member having spaced legs passing on opposite sides of said first member with the upper ends thereof being connected by an upper bar passing over the top of said first member; a transversely extending lower cross bar passing beneath said first member and connected to the lower ends of said spaced legs; and means passing through said slots and slidable therein pivotally connecting said saddle to said second member at a point spaced from said lower cross bar a distance equal to the spacing between said vertical surface and said one of said closed ends, the portions of said saddle legs on opposite sides of said pivot connection being so proportioned as to cause said lower cross bar to ride on said inclined surface and gravitate into locking engagement with said vertical surface as said tow bar is moved from the extended to the contracted position.

7. A tow bar comprising: a first elongated member having a longitudinally extending slot therein with closed ends; a catch on the underside of said first member adjacent one of said closed ends; a second elongated member connected to said first member in a manner to permit relative movement between extended and contracted positions; a saddle member having spaced legs passing on opposite sides of said members and including locking means for engagement with said catch; and means passing through said slot and slidable therein pivotally connecting said saddle legs to said second member at a point spaced from said locking means a distance equal to the spacing between said catch and said one of said closed ends, the portions of said saddle legs on opposite sides of said pivot connection being so proportioned as to cause said saddle to automatically gravitate into locking engagement with said catch when said tow bar is moved from the extended to the contracted position.

References Cited by the Examiner
UNITED STATES PATENTS

| | | | |
|---|---|---|---|
| 2,415,479 | 2/47 | Forney | 280—482 |
| 2,447,737 | 8/48 | Christensen | 280—482 |
| 2,582,595 | 1/52 | Leveke | 280—478 |
| 2,805,082 | 9/57 | Erickson | 280—478 |
| 2,914,343 | 11/59 | Roth | 280—491 |

A. HARRY LEVY, *Primary Examiner.*

LEO FRIAGILA, *Examiner.*